Patented Feb. 12, 1952

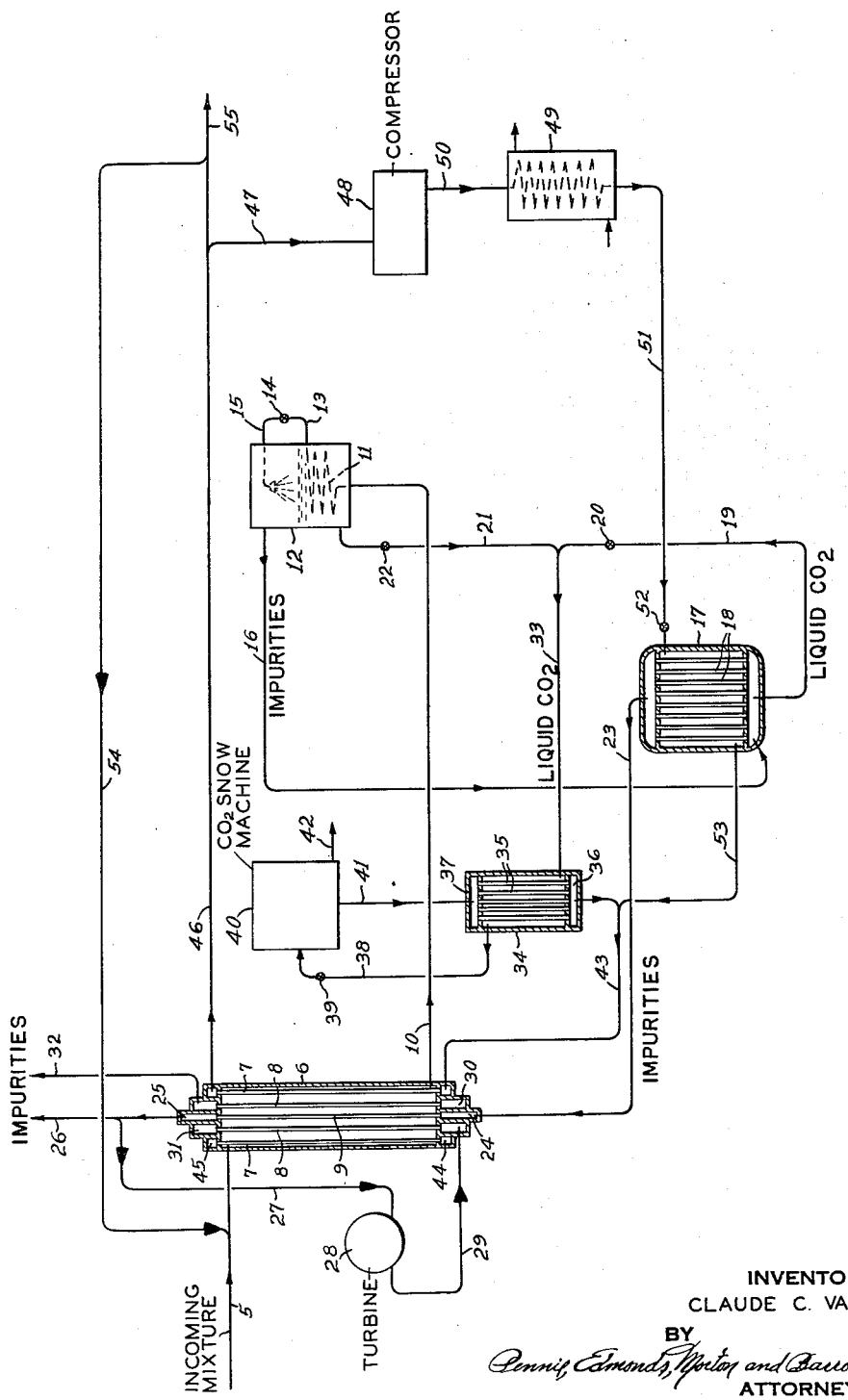

2,585,288

UNITED STATES PATENT OFFICE 2,585,288

RECOVERY OF CARBON DIOXIDE

Claude C. Van Nuys, Greenwich, Conn., assignor to Air Reduction Company, Incorporated, New York, N. Y., a corporation of New York Application October 2, 1947, Serial No. 777,542

9 Claims. (Cl. 62—175.5)

This invention relates to the recovery of carbon dioxide from gaseous mixtures containing it, and particularly to an improved method of separating carbon dioxide from waste industrial gases.

Large quantities of carbon dioxide are utilized in industry. The available supply of pure carbon dioxide is at present less than the demand therefor. Heretofore, much of the carbon dioxide of commerce has been obtained by passing air through a bed or column of incandescent carbon and absorbing the carbon dioxide from the resulting gaseous mixture in solutions of sodium or potassium bicarbonates or of organic amines such as di- or triethanolamine. Such procedures are relatively expensive, thus increasing the cost of the product.

There are now available unused sources of gaseous mixtures containing upward to 80% by volume of carbon dioxide, such as the waste gases from ammonia synthesis plants. Such waste gases contain carbon dioxide mixed usually with proportions of more volatile gases such as hydrogen, nitrogen, carbon monoxide and small quantities of oxygen. The total amount of such impurities rarely exceeds about 20% by volume.

It is the object of the present invention to provide a simple, effective and economical method of separating carbon dioxide from mixed gases containing more volatile constituents, and especially to make available to industry the carbon dioxide which is at present lost. Nearly 200 tons of waste gases including carbon dioxide and the accompanying impurities are discharged to the atmosphere every day by a single ammonia plant which is currently in operation.

Other objects and advantages of the invention will be apparent as it is better understood by reference to the following specification and the accompanying drawing, which indicates diagrammatically apparatus suitable for the practice of the invention.

In carrying out the invention, the gaseous mixture, for example the waste gas from a synthetic ammonia plant containing upward to 88% of carbon dioxide mixed with hydrogen, nitrogen, carbon monoxide and small amounts of oxygen, is compressed to a suitable pressure, i. e. 70 to 100 atmospheres absolute, and passed through the usual inter and after coolers (not shown). The gas is delivered through a pipe 5 to an exchanger 6 having tubes 7, 8 and 9 extending therethrough. The gaseous mixture, at a temperature for example of about 25° C., enters the exchanger 6 and in circulating about the tubes 7, 8 and 9 is cooled to approximately 0° C. by heat exchange with outgoing products of the separation as hereafter described. Leaving the exchanger 6 by the pipe 10, the gaseous mixture is delivered to a coil 11 which is submerged in liquid in a condenser 12. From the coil, the gaseous mixture passes through an expansion valve 14 and thence through a pipe 15 into the condenser 12. In expanding to the lower pressure, part of the gas consisting of carbon dioxide is liquefied to form the liquid which accumulates in the condenser. The residue, including all of the impurities, escapes through a pipe 16 and is delivered to the condenser 17 having a plurality of tubes 18 extending therethrough. After expansion of the gaseous mixtures in the condenser 12, the residue including the impurities is still under a sufficiently-high pressure that when passing through the tubes 18 and subjected to selective liquefaction, the carbon dioxide therein is liquefied and drains to the bottom. It is delivered through a pipe 19 controlled by a valve 20 and joins liquid carbon dioxide withdrawn from the condenser 12 through a pipe 21 controlled by a valve 22.

The unliquefied residue from the condenser 17, which contains all of the gaseous impurities of the original gaseous mixture, is withdrawn through a pipe 23 and delivered to a header 24 at one end of the exchanger 6. It passes through the tubes 9 to a header 25 and may be discharged therefrom through a pipe 26 to the atmosphere. However, this gas is still under substantial pressure. It is preferably diverted through a pipe 27 to an expansion turbine 28 where it is expanded with external work and thereby cooled. It is then delivered through a pipe 29 to a header 30 at one end of the exchanger 6, passes through the tubes 8 and enters the header 31 at the opposite end of the exchanger, from which it is withdrawn and discharged through a pipe 32. Thus, advantage is taken of the cooling effect of the waste gas after expansion.

The liquid carbon dioxide in the pipes 19 and 21 is delivered through a pipe 33 to exchanger 34 having a plurality of tubes 35 therein extending between headers 36 and 37. In the exchanger 34, the liquid is sub-cooled by heat exchange with cold gaseous carbon dioxide derived in the manner hereinafter described. The sub-cooled liquid is delivered through a pipe 38 having an expansion valve 39 to a snow machine 40 wherein a portion of the carbon dioxide is converted to the solid phase, while the remainder usually referred to as "blow-back gas" escapes in the gaseous phase through a pipe 41 and is conducted to the header 37 of the exchanger 34.

The solid carbon dioxide may be withdrawn as indicated by the arrow 42.

The snow machine 40 may be a simple chamber into which the liquid carbon dioxide is expanded. Preferably, however, it is a machine of the type shown in Fig. 5 of the Cole and McLaren Patent No. 2,025,698, in which the snow, after the formation thereof, is subjected to compression to produce a block of carbon dioxide ice. The Cole and McLaren patent represents the standard equipment utilized in the solid carbon dioxide industry. In this apparatus, the liquid carbon dioxide is expanded, the "blow back gas" is withdrawn, and the snow resulting from expansion is compressed into a block and withdrawn.

The carbon dioxide in the gaseous phase, after cooling the liquid in the exchanger 34, is delivered through a pipe 43 to a header 44 at one end of the exchanger 6. It passes through the tubes 7 to a header 45. It is withdrawn through a pipe 46. A portion of this gas is delivered through a pipe 47 to a compressor 48 where the gas is recompressed to a suitable pressure, for example 70 to 100 atmospheres absolute, and after cooling, as for example in a water cooler 49 to which the gas is delivered by a pipe 50, it is conveyed by a pipe 51 to the condenser 17. An expansion valve 52 permits expansion to a pressure preferably of 5.11 atmospheres absolute, corresponding to the triple point of carbon dioxide or lower. At such pressures the fluid entering the condenser 17 will be partly liquid and partly solid. Thus, the compression and expansion of the carbon dioxide from the pipe 46 supplies refrigeration for the condenser 17. After passing through the condenser, the gaseous carbon dioxide escapes through a pipe 53 and joins the gas leaving the exchanger 34 through the pipe 43.

The major portion of the remainder of the carbon dioxide from the pipe 46 is returned through a pipe 54 to the compressor (not shown) and mingles with the incoming mixture, thus increasing the proportion of carbon dioxide therein. Hence, as will be seen, none of the carbon dioxide is lost and all of it eventually is recovered as solid carbon dioxide, excepting only a small portion in the gas in the pipe 46 which may be discharged to the atmosphere through a pipe 55. This small portion is rejected in order to prevent accumulation of impurities in the system. Meanwhile, the system is self-sustaining from a refrigeration standpoint, all of the refrigeration being developed by compression and expansion of the material entering the system.

The quantity of carbon dioxide compressed in the compressor 48 is of the order of 50% by volume of the incoming gaseous mixture. If the pure carbon dioxide gas in the pipe 46 is not added to the incoming gaseous mixture, the method converts around 50% of the incoming carbon dioxide into snow or ice, and thus the quantity of vapor passing through the pipe 54 is somewhat less than 50% of the incoming carbon dioxide. When this part of the carbon dioxide is added to the incoming gaseous mixture the total fraction of carbon dioxide snow or ice which is recovered is about 80% and consequently the unconverted portion is in the neighborhood of 15-20%.

The procedure as described thus affords a simple and commercially applicable system for the recovery of carbon dioxide from waste gases such as those described. The only expense other than that of the apparatus is the power utilized to drive the compressors. The carbon dioxide ice produced in the snow machine has a ready and substantially constant market, and at the present time is adapted to supply a shortage of this commodity.

Various changes may be made in the details of the procedure and in the apparatus employed without departing from the invention or sacrificing the advantages thereof.

I claim:

1. The method of separating carbon dioxide from gaseous mixtures containing more volatile gaseous impurities which comprises compressing and cooling the gaseous mixture, initially expanding the gaseous mixture to provide a gaseous phase containing all of the impurities and a liquid phase consisting of the carbon dioxide, and subjecting the gaseous phase to selective condensation to separate a liquid consisting of carbon dioxide from the gaseous impurities.

2. The method of separating carbon dioxide from gaseous mixtures containing more volatile gaseous impurities which comprises compressing and cooling the gaseous mixture, initially expanding the gaseous mixture to provide a gaseous phase containing all of the impurities and a liquid phase consisting of the carbon dioxide, and subjecting the gaseous phase to selective condensation by heat exchange with the liquid phase from the expansion of compressed carbon dioxide.

3. The method of separating carbon dioxide from gaseous mixtures containing more volatile gaseous impurities which comprises compressing and cooling the gaseous mixture, initially expanding the gaseous mixture to provide a gaseous phase containing all of the impurities and a liquid phase consisting of the carbon dioxide, subjecting the gaseous phase to selective condensation to separate a liquid consisting of carbon dioxide from the gaseous impurities, combining the portions of liquid carbon dioxide from the preceding steps and expanding the liquid carbon dioxide to convert a portion thereof to the solid phase and a portion to the gaseous phase.

4. The method of separating carbon dioxide from gaseous mixtures containing more volatile gaseous impurities which comprises compressing and cooling the gaseous mixture, initially expanding the gaseous mixture to provide a gaseous phase containing all of the impurities and a liquid phase consisting of the carbon dioxide, subjecting the gaseous phase to selective condensation to separate a liquid consisting of carbon dioxide from the gaseous impurities, combining the portions of liquid carbon dioxide from the preceding steps expanding the liquid carbon dioxide to convert a portion thereof to the solid phase and a portion to the gaseous phase and utilizing the gaseous phase from the expansion of the liquid carbon dioxide to sub-cool the liquid carbon dioxide prior to expansion.

5. The method of separating carbon dioxide from gaseous mixtures containing more volatile gaseous impurities which comprises compressing and cooling the gaseous mixture, initially expanding the gaseous mixture to provide a gaseous phase containing all of the impurities and a liquid phase consisting of the carbon dioxide, subjecting the gaseous phase to selective condensation to separate a liquid consisting of carbon dioxide from the gaseous impurities, combining the portions of liquid carbon dioxide from the preceding steps expanding the liquid carbon dioxide to convert a portion thereof to the solid phase and a portion to the gaseous phase, utilizing the gaseous phase from the expansion of the liquid carbon dioxide to sub-cool the liquid carbon dioxide prior to expansion, and recompressing, cooling and expanding a portion of the carbon dioxide which escapes solidification to maintain refrigeration.

6. The method of separating carbon dioxide from gaseous mixtures containing more volatile gaseous impurities which comprises compressing and cooling the gaseous mixture, initially expanding the gaseous mixture to provide a gaseous phase containing all of the impurities and a liquid phase consisting of the carbon dioxide, subjecting the gaseous phase to selective condensation to separate a liquid consisting of carbon dioxide from the gaseous impurities, combining the portions of liquid carbon dioxide from the preceding steps expanding the liquid carbon dioxide to convert a portion thereof to the solid phase and a portion to the gaseous phase, utilizing the gaseous phase from the expansion of the liquid carbon dioxide to sub-cool the liquid carbon dioxide prior to expansion, recompressing, cooling and expanding a portion of the carbon dioxide which escapes solidification to maintain refrigeration, and returning the balance of the carbon dioxide escaping solidification and mingling it with the incoming gaseous mixture.

7. The method of separating carbon dioxide from gaseous mixtures containing more volatile gaseous impurities which comprises compressing and cooling the gaseous mixture, initially expanding the gaseous mixture to provide a gaseous phase containing all of the impurities and a liquid phase consisting of carbon dioxide, subjecting the gaseous phase to selective liquefaction by heat exchange with liquid carbon dioxide produced by recompression, cooling and expansion of a part of the carbon dioxide recovered, combining the portions of liquid carbon dioxide derived from the liquid phase from the initial expansion and the selective liquefaction of the gaseous phase therefrom, expanding the combined portions of the liquid carbon dioxide to produce a solid phase and a residual gaseous phase, and utilizing the residual gaseous phase to sub-cool the liquid carbon dioxide before expansion.

8. The method of separating carbon dioxide from gaseous mixtures containing more volatile gaseous impurities which comprises compressing and cooling the gaseous mixture, initially expanding the gaseous mixture to provide a gaseous phase containing all of the impurities and a liquid phase consisting of carbon dioxide, subjecting the gaseous phase to selective liquefaction by heat exchange with liquid carbon dioxide produced by recompression, cooling and expansion of a part of the carbon dioxide recovered, combining the portions of liquid carbon dioxide derived from the liquid phase from the initial expansion and the selective liquefaction of the gaseous phase therefrom, expanding the combined portions of the liquid carbon dioxide to produce a solid phase and a residual gaseous phase, utilizing the residual gaseous phase to sub-cool the liquid carbon dioxide before expansion, returning a portion thereof and mingling it with the incoming gaseous mixture.

9. The method of separating carbon dioxide from gaseous mixtures containing more volatile gaseous impurities which comprises compressing and cooling the gaseous mixture, initially expanding the gaseous mixture to provide a gaseous phase containing all of the impurities and a liquid phase consisting of carbon dioxide, subjecting the gaseous phase to selective liquefaction by heat exchange with liquid carbon dioxide produced by recompression, cooling and expansion of a part of the carbon dioxide recovered, combining the portions of liquid carbon dioxide derived from the liquid phase from the initial expansion and the selective liquefaction of the gaseous phase therefrom, expanding the combined portions of the liquid carbon dioxide to produce a solid phase and a residual gaseous phase, utilizing the residual gaseous phase to sub-cool the liquid carbon dioxide before expansion, and expanding the gaseous residue of impurities from the selective liquefaction with external work to afford additional refrigeration.

CLAUDE C. VAN NUYS.

REFERENCES CITED

The following references are of record in the file of this patent:

UNITED STATES PATENTS

| Number | Name | Date |
|---|---|---|
| 1,497,546 | Claude et al. | June 10, 1924 |
| 1,939,696 | Hasche | Dec. 19, 1933 |
| 1,971,106 | Hasche | Aug. 21, 1934 |
| 2,011,550 | Hasche | Aug. 13, 1935 |